United States Patent [19]

Mizui

[11] Patent Number: 5,013,785

[45] Date of Patent: May 7, 1991

[54] PRESSURE-SENSITIVE ADHESIVE COMPOSITION COMPRISING POLY-4-METHYL-1-PENTENE AS TACKIFIER

[75] Inventor: Kinya Mizui, Ichihara, Japan

[73] Assignee: Mitsui Petrochemical Industries, Ltd., Tokyo, Japan

[21] Appl. No.: 210,492

[22] PCT Filed: Oct. 8, 1987

[86] PCT No.: PCT/JP87/00760

§ 371 Date: Aug. 8, 1988

§ 102(e) Date: Aug. 8, 1988

[87] PCT Pub. No.: WO88/02767

PCT Pub. Date: Apr. 21, 1988

[30] Foreign Application Priority Data

Oct. 8, 1986 [JP] Japan ................................. 61-238035

[51] Int. Cl.$^5$ ........................ C08K 5/01; C08L 23/20; C09J 11/08

[52] U.S. Cl. .................................. 524/490; 524/552; 524/571; 524/572; 524/574; 524/575; 524/575.5; 525/98; 525/191; 525/215; 525/232; 525/240; 525/918; 526/348.4; 156/334

[58] Field of Search ............... 526/348.2, 348.4, 348.6, 526/185, 237, 186; 156/334; 525/222, 232, 98, 191, 215, 240; 524/490, 552, 571, 572, 574, 575, 575.5

[56] References Cited

U.S. PATENT DOCUMENTS

| | | | |
|---|---|---|---|
| 3,299,022 | 1/1967 | Edwards | 526/237 |
| 3,317,501 | 5/1967 | Edwards | 526/348.4 |

FOREIGN PATENT DOCUMENTS

| | | | |
|---|---|---|---|
| 0223858 | 6/1987 | European Pat. Off. | |
| 0031717 | 2/1984 | Japan | 526/348.4 |

OTHER PUBLICATIONS

Richards, Butyl Rubber and Polyisobutylene, Handbook of Adhesives, Skeist (ed), Van Nostrand Reinhold, N.Y., 221-23, 1962.

Kennedy et al., Crystalline Poly(3-methyl Butene-1) Obtained by Cationic Polymerization, Die Makromolekulare Chemie, 53, 28-32 (1962).

Derwent Abstract, JP-A-57 021 472 (Mitsui Petrochem. Inc. K.K.) 4/2/82, (Abstract).

*Primary Examiner*—Fred Teskin
*Attorney, Agent, or Firm*—Birch, Stewart, Kolasch & Birch

[57] ABSTRACT

In the present invention, a polymer having a number average molecular weight (Mn) of from 200 to 40,000 and a glass transition point of from −75° C. to +10° C. which is obtained by the cationic polymerization of a branched alpha-olenin is used as a tackifier (a tacky producer) for a hot melt adhesive or a pressure-sensitive adhesive. An adhesive composition containing the polymer described above as a tackifier has excellent heat resistance, hue, weather resistance, and the like and has such excellent characteristics that its odor is weak.

3 Claims, No Drawings

PRESSURE-SENSITIVE ADHESIVE COMPOSITION COMPRISING POLY-4-METHYL-1-PENTENE AS TACKIFIER

TECHNICAL FIELD

The present invention relates to tackifiers for adhesives comprising specific olefinic polymers (hereinafter sometimes referred to as tacky producers)

BACKGROUND ART

Cationic polymers obtained by cationic polymerization of branched alpha-olefins such as 4-methyl-1-pentene have been long known. For example, Japanese Patent Publn. No. 24480/1965 describes a process for polymerizing 3-methyl-1-butene or 4-methyl-1-pentene at low temperatures and suggests that the resulting crystalline polymers are suitable for producing plastics films or sheets. Said Japanese Patent Publn. describes that when an alpha-isomonoolefin is polymerized in the presence of a Friedel-Crafts type catalyst at a temperature of from −10° C. to 100° C., amorphous polymers are obtained and that the amorphous polymers are suitable for use as paints, varnish lacquers, other additives, plasticizers, reinforcing agents and diluents. Further, U.S. Pat. No. 3,299,022 describes homopolymers of branched alpha-olefins and copolymers thereof, and discloses that polymers having molecular weights of from 1,500,000 to 2,000,000 are amorphous viscoelastic solids. Furthermore, U.S. Pat. No. 3,317,501 describes cationic polymers of 4-methyl-1-pentene and discloses that polymers having molecular weights of no more than 5,000, which are obtained by polymerizing 4-methyl-1-pentene in the presence of an $AlCl_3$ catalyst at a temperature of from 54° to 170° F., are tacky oils. Moreover, this patent describes that when the polymers having elasticity are mixed with polypropylene, the low-temperature impact resistance of the resulting polypropylene is improved. Further, Macromolecules, Vol, 10, No. 1 pp. 188 discloses that cationic polymers of 4-methyl-1-pentene have five structures.

We have carried out studies with respect to cationic polymers of branched alpha-olefins such as 4-methyl-1-pentene having specific properties, and have now found that these polymers are excellent as a tackifier for an adhesive which is not described in the literatures described above.

DISCLOSURE OF INVENTION

A tackifier for an adhesive according to the present invention is characterized in that it comprises a polymer having a number average moleculer weight (Mn) of from 200 to 40,000 and a glass transition point of from −75° C. to +10° C. which is obtained by the cationic polymerization of a branched alpha-olefin. The polymer is used as an adhesive or a tackifier for an adhesive.

BEST MODE FOR CARRYING OUT THE INVENTION

Tackifiers for adhesives according to the present invention will be described in greater detail hereinafter.

Branched alpha-olefin

Examples of branched alpha-olefins which constitute polymers according to the present invention include 3-methyl-1-butene, 4-methyl-1-pentene, 5-methyl-1-hexene, 3-methyl-1-pentene, 3-methyl-1-hexene, 4-methyl-1-hexene, 4-methyl-1-heptene, 5-methyl-1-heptene, and 3-methyl-1-pentene. Of these, 4-methyl-1-pentene is preferable. These branched alpha-olefins can be used alone or in mixture.

Polymerization Conditions

In polymerizing the branched alpha-olefin as described above, Friedel-Crafts type catalysts such as $AlCl_3$, $C_2H_5AlCl_2$, $(C_2H_5)_2AlCl$, $AlBr_3$, and $SnCl_4$; and alkyl halides such as $(CH_3)_3C\ Cl$, $C_2H_5Br$, $C_2H_5Cl$ and $CH_3Cl$ are used as the polymerization catalyst alone or in combination. These catalysts can be optionally used in combination with a co-catalyst such as $CH_2=CHCl$.

A solvent is not necessarily used because the aforementioned alkyl halide per se acts as a solvent. Solvents such as hexane and heptane may be used.

The polymerization temperature is usually within the range of from +80° C. to −100° C., and particularly preferably from +30° C. to −60° C. Conditions other than the conditions described above can be suitably selected from those described in the known technical literatures described above. Polymerization which proceeds under such conditions is cationic polymerization.

Properties of Polymer

In the present invention, the number average molecular weight (Mn) of the polymer obtained by the cationic polymerization of the branched alpha-olefin which is used as a tackifier for an adhesive is within the range of from 200 to 40,000, and particularly preferably from 300 to 30,000. If the molecular weight of this polymer is less than 200, the heat loss during the melting process will be increased and the adhesion strength (or tack strength) will be reduced. Thus, the molecular weight of less than 200 is not preferable. If the molecular weight of the polymer is more than 40,000, the tack and adhesion strength (or the tack strength) will be reduced. Thus, the molecular weight of more than 40,000 is not preferable.

The glass transition point (Tg) of the polymer is within the range of from −75° C. to +10° C., and particularly preferably from −60° C. to −30° C. If the glass transition point of the polymer is less than −75° C., the heat loss during the melting process will be increased and the adhesion strength (or the tack strength) will be reduced. Thus, the glass transition point of less than −75° C. is not preferable. If the glass transition point of the polymer is more than +10° C., the tack and adhesion strength (or the tack strength) will be reduced. Thus, the glass transition point of more than +10° C. is not preferable.

The polymer used in the present invention has characteristics as described above. Further, the weight average molecular weight (Mw) is usually from 300 to 150,000, and preferably from 900 to 130,000. It is preferred that the Mw/Mn which is an index showing a molecular weight distribution is from 1.3 to 4.0, and preferably from 1.5 to 3.0.

Tackifier for Adhesive

A tackifier for an adhesive according to the present invention comprises the specific polymer described above (hereinafter sometimes referred to as polymer A).

In general, compositions for adhesives include a hot melt type adhesive obtained by incorporating a tackifier (a tack producer) as well as optional waxes and other additives in a base resin such as an ethylene-vinyl acetate copolymer; and a pressure-sensitive type adhesive obtained by incorporating a tackifier as well as optional solvents and other additives into a base resin such as a natural rubber or synthetic rubber. The hot melt adhesive is generally used as an adhesive or coating in the fields such as bookbinding, canning, woodworking, laminating, sheeting and coating. The pressure-sensitive adhesive is generally coated onto substrates such as papers, fabrics and plastic films to form adhesive tapes and labels. In any case, these adhesive compositions are prepared by incorporating the tackifier (the tack producer) in the base resin. Particularly, in the case of the hot melt adhesive, such tackifiers should have good compatibility with the base resin such as ethylene-vinyl acetate copolymer and the waxes, excellent adhesion properties, a good melting viscosity, excellent flexibility, good heat resistance, excellent light resistance and good hue.

On the other hand, the tackifier (the tack producer) for the pressure-sensitive adhesive should have the following properties in combination: excellent compatibility with the base resin such as natural rubber or synthetic rubber, good solubility in a solvent, good chemical stability, excellent weather resistance, good hue and low odor.

When polymer A used in the present invention is employed in the hot melt adhesive as the tackifier, examples of base resins for use herein include ethylene-vinyl acetate copolymers, polyethylene, polypropylene, ethylene-propylene copolymers, ethylene-acrylic acid copolymers, ethylene-acrylate copolymers, polyesters, polyamides, and polyvinyl acetate. In the case of the hot melt composition, it is particularly preferred to use ethylene-vinyl acetate copolymers and ethylene-acrylate copolymers as the base resin.

When polymer A used in the present invention is employed in the pressure-sensitive adhesive as the tackifier, examples of the base resins for use herein include rubbery polymers such as natural rubbers, styrene-butadiene copolymer rubbers, polybutadiene, polyisoprene, polyisobutylene, butyl rubbers, polychloroprene, ethylene-propylene copolymer rubbers, ethylene-propylene alpha-olefin copolymer rubbers, ethylene-propylene-diene copolymer rubbers, styrene-butadiene-styrene block copolymers, styrene-isoprene-styrene block copolymers, hydrogenated styrene-butadiene-styrene block copolymers (SEBS), and hydrogenated styrene-isoprene-styrene block copolymers. The styrene-butadine-styrene block copolymers, styrene-isoprene-styrene block copolymers and hydrogenated copolymers thereof are particularly preferred.

The ratio of polymer A used as the tackifier in the present invention to the base resin differs more or less between the hot melt adhesive composition and the pressure-sensitive adhesive composition. In the case of the hot melt adhesive composition, the amount of the tackifier is usually within the range of from 20 to 300 parts by weight, preferably from 30 to 200 parts by weight per 100 parts by weight of the base resin. In the case of the pressure-sensitive adhesive composition, the amount of the tackifier is usually within the range of from 20 to 200 parts by weight, preferably from 30 to 150 parts by weight per 100 parts by weight of the base resin.

In addition to the tackifier and base resin components, the adhesive composition containing polymer A according to the present invention can also contain optional various additives. For example, in the case of the hot melt composition, waxes such as petroleum paraffin wax, polyolefin wax and microcrystalline wax having a melting point of about 40° C. to about 60° C., and antioxidants such as phenolic or bisphenolic organic compounds and metal soaps are used as the additives. In the case of the pressure-sensitive composition, softening agents such as dioctyl phthalate, dibutyl phthalate, machine oil, process oil and polybutene; fillers such as calcium carbonate, zinc white, titanium oxide and silica; antioxidants such as amine, ketone-amine and phenolic compounds; and stabilizers are used as the additives. The amount of these additives are suitably determined depending on their uses or the like.

A process for preparing the adhesive composition containing polymer A as the tackifier of the present invention is different between the hot melt adhesive composition and the pressure-sensitive adhesive composition. In preparing the hot melt composition, a mixture of polymer A as the tackifier, the base resin described above and the optional various additives described above are heated with stirring to prepare a homogeneous melt, and this melt is formed into granules, flakes, pellets and rods on cooling depending on its uses. The resulting hot melt adhesive composition is again melted or employed in coating uses. For example, when it is employed in adhesion uses, a welding gun can be packed with a rod-like product in order to carry out corner adhesion of a molded product.

On the other hand, the pressure-sensitive adhesive composition can be prepared by conventional methods. For example, it can be prepared by kneading a mixture of polymer A as the tackifier according to the present invention, the base resin described above and the optional various additives described above, on a roll; or by dissolving the mixture in a suitable solvent.

When the adhesive composition containing polymer A as the tackifier according to the present invention is a hot melt adhesive composition and this hot adhesive composition is used as an adhesive or coating, polymer A as the tackifier exhibits excellent compatibility with the base resin, and has excellent heat resistance, hue and odor characteristics. Accordingly, a homogeneous hot melt adhesive composition is obtained, and this hot melt adhesive composition has excellent heat resistance and hue. Further, odor is weak during the preparation process and in use of the hot melt adhesive composition. When polymer A as the tackifier according to the present invention is used in the pressure-sensitive adhesive composition, polymer A as the tackifier exhibits excellent compatibility with the base resin, and has excellent heat resistance, hue, and odor characteristics and weather resistance. Accordingly, a homogeneous pressure-sensitive adhesive composition is obtained, and this pressure-sensitive adhesive composition has excellent hue and weather resistance. Further, odor is weak.

While the present invention is illustrated by the following examples, the present invention is not limited to these examples.

Physical properties described in the examples were measured by the following methods.

(1) Hue was measured according to ASTM D-1544-58-T and expressed in a Gardner number (G.No.).

(2) Molecular weight and molecular weight distribution were determined on a polystyrene basis from a chromatogram obtained by measuring in a tetrahydrofuran solvent at a temperature of 40° C. by means of a HLC-802 R type high-performance liquid chromatography manufactured by Toyo Soda. (Columns: G 4000H8, G 3000 H8 and two G 2000H8 available from the same company)

(3) Glass transition point (Tg) was measured in an amount of sample of 10 mg at an elevation rate of 10° C./minute by means of a differential scanning calorimeter DS-20 manufactured by Seiko Denshi Kogyo.

EXAMPLE 1

A mixture of 84 grams of 4-methylpentene-1 and 158 grams of hexane was dropwise added to a catalyst slurry containing 1.3 gram of anhydrous aluminum chloride and 94 grams of ethyl chloride at a temperature of 5° C. (the dropping time was 50 minutes). After 2 hours from dropping initiation, 40 ml of methanol was added to carry out deliming and the reaction mixture was washed with water.

The resulting polymerized oil was concentrated to obtain 82 grams of a polymer having a hue of no more than 1 (G. No.), a molecular weight of 1500, a molecular weight distribution of 2.5 and a glass transition point of $-56°$ C.

EXAMPLE 2

Eighty-four grams of 4-methylpentene-1 were dropwise added to a catalyst slurry containing 1.3 gram of anhydrous aluminum chloride and 84.0 grams of xylene at a temperature of 5° C. (the dropping time was 50 minutes). After 2 hours from dropping initiation, 40 ml of methanol was added to carry out deliming and the reaction mixture was washed with water.

The resulting polymerized oil was concentrated to obtain 60 grams of a polymer having a hue of no more than 1 (G.No.), a molecular weight (Mn) of 730, a ratio of Mw/Mn of 1.5 and a glass transition point of $-57°$ C.

EXAMPLE 3

A mixture of 84 grams of 4-methylpentene-1 and 158 grams of hexane was dropwise added to a catalyst slurry containing 1.3 gram of anhydrous aluminum chloride and 94 grams of ethyl chloride at a temperature of $-50°$ C. (the dropping time was 50 minutes). After 2 hours from dropping initiation, 40 ml of methanol was added to carry out deliming, and the reaction mixture was washed with water.

The product was deposited with methanol to obtain 80 grams of a polymer having a hue of no more than 1 (G.No.), a molecular weight of 14000, a molecular weight distribution of 2.8 and a glass transition point of $-50°$ C.

EXAMPLES 4 THROUGH 6

125 parts by weight of each of the polymers obtained in Examples 1 through 3 were incorporated as a tackifier in 100 parts by weight of an SEBS block copolymer that is a hydrogenated styrene-butadiene-styrene block copolymer ("G-1657" available from shell Chemical), 75 parts by weight of a commercially available hydrogenated petroleum resin ("Arkon P-70" available from Arakawa Kagaku) and 1 part by weight of a stabilizer ("Irganox 1010" available from Geigy company), and the resulting mixture was kneaded for 30 minutes at a temperature of 150° C. by means of a kneader to prepare an adhesive composition.

This adhesive composition was hot melted for 20 minutes on a polyester film having a thickness of 25 microns present on a hot plate at 195° C., and applied to a thickness of $30\pm5$ micrometers by means of an applicator to prepare an adhesive tape.

The performance of the adhesive composition was then evaluated by the test methods shown below.

(1) Compatibility of the blend was measured by applying a hot melted adhesive composition to a glass plate to a thickness of from 2 to 3 mm and evaluating the transparency of the adhesive composition.

A: compatibility is good (transparent);
B: compatibility is slightly poor (translucent); and
C: compatibility is poor (opaque).

(2) Tack (ball No.) was measured at a temperature of 20° C. according to a J. Dow method.

(3) Adhesive strength (gram per a width of 25 mm) was measured at a temperature of 20° C. according to a JIS Z-1524 method.

(4) Cohesion (mm per 2 hours) was measured at a temperature of 20° C. according to a JIS Z-1524 method.

The results obtained by the test methods described above are shown in Table 1.

COMPARATIVE EXAMPLE 1

Examples 4 through 6 were repeated except that the polymers obtained in Examples 1 through 3 were replaced with a commerically available liquid resin A ("Regalrez 1018" available from Hercules).

COMPARATIVE EXAMPLE 2

Examples 4 through 6 were repeated except that the polymers obtained in Examples 1 through 3 were replaced with a commercially available liquid resin B "Polybutene 10H-T" available from Idemitsu Sekiyu Kagaku).

COMPARATIVE EXAMPLE 3

Examples 4 through 6 were repeated except that the polymers obtained in Examples 1 through 3 were replaced with a commercially available liquid resin C ("Kuraprene LIR-50 having a molecular weight of 47000 available from Kurare Isoprene Chemical).

TABLE 1

| | Performance of Adhesive | | | | |
|---|---|---|---|---|---|
| | Blend compatibility | Tack at 10° C. (ball No.) | Tack at 20° C. (ball No.) | Adhesive Strength at 20° C. (g/25 mm width) | Cohesion at 20° C. (mm/2 hours) |
| Example 4 | A | 16 | 28 | 800 | 0.2 |
| Example 5 | A | 18 | 30 | 700 | 0.2 |
| Example 6 | A | 8 | 15 | 1500 | 0.1 |
| Comparative Example 1 | A | 2 | 2 | 1000 | 0.1 |
| Comparative Example 2 | B | <2 | 6 | 350 | Fell Immediately after loading |
| Comparative Example 3 | C | 3 | 10 | 50 | Fell Immediately after loading |

What is claimed is:

1. A pressure-sensitive adhesive composition comprising a rubbery hydrocarbon polymer or polychloroprene as a base resin and from 20 to 200 parts by weight of a tackifier per 100 parts by weight of the base resin, the improvement wherein said tackifier comprises a cationically polymerized poly-4-methyl-1-pentene having a number average molecular weight (Mn) of from 200 to 40,000 and a glass transition point of from −75° C. to +10° C.

2. The pressure sensitive adhesive composition according to claim 1, wherein said base resin is selected from the group consisting of a natural rubber, a styrene-butadiene copolymer rubber, polybutadiene, polyisoprene, polyisobutylene, a butyl rubber, polychloroprene, an ethylene-propylene copolymer rubber, an ethylene-propylene-alpha-olefin copolymer rubber, an ethylene-propylene-diene copolymer rubber, a styrene-butadiene-styrene block copolymer, a styrene-isoprene-styrene block copolymer, a hydrogenated styrene-butadiene-styrene block copolymer, and a hydrogenated styrene-isoprene-styrene block copolymer.

3. The pressure sensitive-adhesive composition according to claim 1, wherein said poly-4-methyl-1-pentene has a number average molecular weight (Mn) of from 300 to 30,000, a ratio of a weight average molecular weight (Mw) to the number average molecular weight (Mn) of from 1.3 to 4.0, and a glass transition point of from −60° C. to −30° C.

* * * * *